United States Patent Office 2,962,469
Patented Nov. 29, 1960

2,962,469

POLYMERIZABLE COMPOSITIONS CONTAINING DICYCLOPENTADIENE DIOXIDE AND POLY-CARBOXYLIC ACID AND RESINS PREPARED THEREFROM

Benjamin Phillips, Charleston, and Charles W. McGary, Jr., and Charles T. Patrick, Jr., South Charleston, W. Va., assignors to Union Carbide Corporation, a corporation of New York No Drawing. Filed July 31, 1957, Ser. No. 675,253

26 Claims. (Cl. 260—45.4)

This invention relates to polyepoxide compositions and, more particularly, to polymerizable diepoxide compositions and to resins made therefrom. It is directed to polymerizable compositions comprising dicyclopentadiene dioxide and polycarboxylic acids, and to resins formed therefrom.

This application is a continuation-in-part of application Serial No. 675,252, entitled "Polymerizable Compositions and Resins Made Therefrom," by B. Phillips, C. W. McGary, Jr., and C. T. Patrick, Jr., filed July 31, 1957, and assigned to the same assignee as the instant application.

Our resins are water-resistant solids and can be made as hard, tough, infusible products which are insoluble in most organic solvents. The properties of our resins can be easily controlled as to degree of rigidity and flexibility such that resins having the properties needed to fit various requirements of rigidity or flexibility can be obtained.

These resins can be machined to desired shapes or configurations and can be polished to provide appealing finishes. They can be also made into articles having capabilities of sustaining greater loads at higher temperatures than other known polycarboxylic acid-hardened epoxide resins. In accordance with our invention, resins having a combination of any of these useful properties can be produced.

Our polymerizable compositions range from room temperature solids to liquids and can be easily polymerized by maintaining the composition at an elevated temperature. The solid compositions are particularly valuable as molding materials and as laminating materials for such applications as preloading glass cloth. The preloaded glass cloth may then be laminated in the usual manner to produce glass laminates with outstanding strengths. By elevating the temperature of our solid compositions, low-viscosity, polymerizable, liquid compositions are obtained. These polymerizable liquid compositions have pot-lives of sufficient duration to permit the addition of fillers and pigments to alter the physical characteristics and appearance, respectively, of our resins. With or without fillers and pigments the liquid compositions are readily pourable and are capable of flowing into intricate corners of molds so that accurately molded articles result. These liquid compositions can be also flowed, sprayed or spread on surfaces and cured to provide durable protective finishes thereto. Our polymerizable compositions are also soluble in many organic solvents, such as, acetone, methyl isobutyl ketone, ethyl acetate, butyl acetate, toluene, xylene and the like. Solutions thus formed can be flowed, sprayed or spread on surfaces, the solvent driven off and the composition cured to provide durable coatings. Our compositions can also be partially cured to solid resins, ground or granulated and employed as molding or laminating materials.

The polymerizable compositions of this invention can be advantageously made by mixing dicyclopentadiene dioxide with a polycarboxylic acid. Dicyclopentadiene dioxide is a crystalline solid which melts at about 184° C. and can be readily dissolved by many solvents including the liquid polycarboxylic acids at temperatures well below its melting point. The compositions can be prepared in any suitable manner as by mechanically mixing the liquid or granular forms of dicyclopentadiene dioxide with the liquid or granular forms of the polycarboxylic acid. It is preferred to form a homogeneous mixture of dicyclopentadiene dioxide and polycarboxylic acid prior to curing. When a polycarboxylic acid which is liquid at room temperature is employed, a homogeneous mixture can be advantageously obtained by mixing the acid and dicyclopentadiene dioxide at room temperature and elevating the temperature with stirring to a point where a solution is formed. When a solid polycarboxylic acid is used, it is advantageous first to melt either the acid or dicyclopentadiene dioxide whichever is lower melting and add the other thereto, stirring the mixture until a solution is formed. If needed, a further elevation of temperature will aid the formation of a solution. Temperatures required for forming a homogeneous solution have been found to vary from 25° C. to 200° C. depending upon the particular polycarboxylic acid employed. Stirring aids the formation of a solution or homogeneous mixture, although it may not be necessary. After all of the composition components have been added, the solutions can be cooled to room temperatures and stored for future use, if desired, or used immediately. Granular or powdered dicyclopentadiene dioxide can be used and also when a solid polycarboxylic acid is employed the granular or powdered form thereof can be mechanically mixed with the granular or powdered form of dicyclopentadiene dioxide to produce a polymerizable composition which is particularly useful as a molding composition or a preloading composition for making glass laminates.

Acidic catalysts in concentrations ranging up to about 5.0 weight percent based on the weight of dicyclopentadiene dioxide can be added at this point, at any time before curing or not at all, as desired. Acidic catalysts have been found to be effective in increasing the rate of cure of our compositions. Catalyst concentrations higher than 5.0 weight percent are also effective, although concentrations of 5.0 weight percent and below have been found to be adequate. Catalyst concentrations of 0.01 to 5.0 weight per cent based on the weight of dicyclopentadiene dioxide are particularly preferred.

Our polymerizable compositions can also contain polycarboxylic acid anhydrides which when used reduce the curing rate and modify properties, such as, rigidity, and hardness, of resins produced from such compositions. Polycarboxylic acid anhydrides are preferably added with the polycarboxylic acids to dicyclopentadiene dioxide or they can be added prior to or subsequent to the addition of said acids. Homogeneous compositions may be obtained in the manner already described or in any other suitable manner. Other polyfunctional materials can be incorporated into our compositions for developing special properties in the resins made therefrom. Such polyfunctional materials include polyhydric phenols, other polyepoxides, e.g., polyglycidyl ethers of polyhydric phenols and the like, low-molecular weight melamine-formaldehyde, urea-formaldehyde or phenol-formaldehyde polymers and the like.

Curing can be carried out by maintaining the polymerizable compositions at temperatures from 50° C. to 200° C. The time required for effecting a complete cure can be made to vary from several minutes to several hours depending upon the curing temperature and whether a catalyst is used. A high curing temperature provided resins in less time than a low curing temperature and the presence of a catalyst will also shorten the curing time. It is advantageous, however, to heat the polymerizable composition at a temperature in the range from 50° C. to 150° C. to first effect a partial cure. A temperature from 100° C. to 200° C. then can be used to complete the cure. However, any one or combination of two or more temperatures within the above-specified range of 50° C. to 250° C. can be employed if desired, to effect a complete cure.

While not wishing to be held to any particular theory or mechanics of reactions, it is believed that in curing, one epoxy group of a dicyclopentadiene dioxide molecule can be monofunctional when reacted with polycarboxylic acids, such that, one carboxy group of the acid reacts with a single epoxy group to form an ester linkage, i.e.,

interconnecting the acid molecule with the diepoxide molecule and a hydroxyl group attached to said diepoxide molecule. This reaction can be represented by the equation:

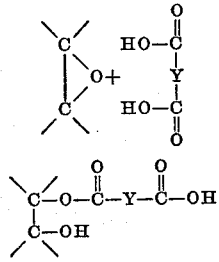

wherein

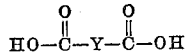

represents a polycarboxylic acid. A hydroxyl group such as that formed by this reaction and which is attached to the diepoxide molecule is believed to be capable of reacting with an epoxy group, a carboxy group or an oxydicarbonyl group of polycarboxylic acid anhydride to bring about cross-linking. Flexibilities of our resins have been found to be controllable through the selection and use in compositions from which they are made of various polycarboxylic acids having different numbers of carboxy groups and different numbers of atoms in chains connecting the carboxy groups. It has been found that our compositions containing polycarboxylic acids having more than two carboxy groups, for example, tend to form hard, rigid resins and that compositions containing polycarboxylic acids having higher numbers of carboxy groups form harder and more rigid resins than those compositions containing polycarboxylic acids with lower numbers of carboxy groups. It has furthermore been found that our compositions which contain dicarboxylic acids having greater numbers of atoms in the shortest chains connecting the carboxy groups tends to form more flexible resins than those compositions which contain dicarboxylic acids with fewer atoms in the shortest chains connecting the carboxy groups. It is possible, therefore, through the selection and use of polycarboxylic acids in our compositions to produce resins having properties which fit particular applications.

Similarly, it is believed that during curing, one epoxy group of a dicyclopentadiene dioxide molecule can be difunctional when reacted with polycarboxylic acid anhydrides, such that, the equivalent of two carboxy groups of the anhydride can be thought of as reacting with a single epoxy group to form two ester linkages,

interconnecting the epoxide molecule with two anhydride molecules. Disregarding the particular reaction steps or mechanism this reaction can be typified by the general equation:

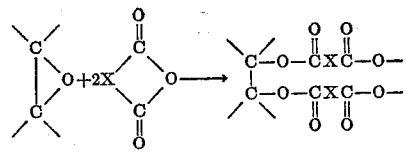

wherein,

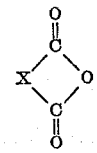

represents a polycarboxylic acid anhydride. This reaction of polycarboxylic acid anhydrides and dicyclopentadiene dioxide is believed to provide cross-linking which increases the rigidity of resins formed from polymerizable compositions containing them. Additionally, some degree of cross-linking can be brought about by etherification of epoxy groups of different dicyclopentadiene dioxide molecules as represented by the equation:

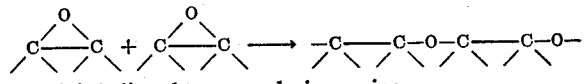

which is believed to occur during curing.

Our resins can be made as solid products which are water-resistant. As an illustration, these resins can be made from compositions containing dicyclopentadiene dioxide, polycarboxylic acids in amounts having $y$ carboxy equivalents for each epoxy equivalent, and polycarboxylic acid anhydrides in amounts having $x$ carboxy equivalents for each epoxy equivalent, wherein $y$ is a number from 0.2 to 2.7, $x$ is a number from 0.0 to 1.0, the sum of $x$ and $y$ is not greater than 2.7 and the ratio of $x/y$ is less than one. By the term "carboxy equivalent," as used herein, with regard to polycarboxylic acid anhydrides, is meant the number of moles of carboxy groups, —COOH which would be contained by an amount of the hydrated anhydride or the polycarboxylic acid from which it can be derived, e.g., one mole of phthalic anhydride is considered to have 2 carboxy equivalents. The term "carboxy equivalent," as used herein, is meant to indicate the number of moles of carboxy groups, —COOH, contained by an amount of carboxylic acid, for example, one mole of a dicarboxylic acid contains 2 carboxy equivalents. By the term "epoxy equivalent," as used herein, is meant the number of moles of epoxy groups,

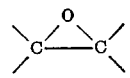

contained by an amount of dicyclopentadiene dioxide. In determining the value of $x/y$ in the case where the denominator, $y$, may be zero, the quotient of $x/y$, as used herein, is taken to be equal to infinity or a number greater than one.

Resins which are hard, tough, infusible products which resist the chemical action of organic solvents also can be made by our invention. Illustratively, our polymerizable compositions can be made from dicyclopentadiene dioxide, polycarboxylic acids in amounts containing $y$ carboxy equivalents for each epoxy equivalent, and polycarboxylic acid anhydrides in amounts containing $x$ carboxy equivalents for each epoxy equivalent, wherein $y$ is a number from 0.5 to 2.0, $x$ is a number from 0.0 to 1.0, the sum of $x$ and $y$ is not greater than 2.0 and the ratio of $x/y$ is less than one. These polymerizable compositions can be cured to tough, hard, infusible resins.

Dicyclopentadiene dioxide, i.e., 4,10-dioxapentacyclo[6.3.1.0^{2,7}.0^{3,5}.0^{9,11}]-dodecane, is a diepoxide having the formula:

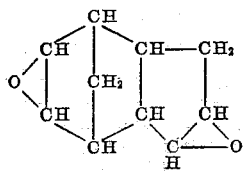

This diepoxide can be made by epoxidizing dicyclopentadiene with a suitable epoxidizing agent. Suitable epoxidizing agents include organic peracids, e.g., peracetic acid, and aldehyde monoperacylates, e.g., acetaldehyde monoperacetate. The epoxidation reaction can be advantageously carried out by charging dicyclopentadiene to a reaction vessel and then gradually adding the epoxidizing agent. In order to provide ease of handling and to avoid the formation of highly concentrated or crystalline peracetic acid with its attendant explosion hazard, the epoxidizing agent preferably is employed in a solvent, as for example, acetone, chloroform, methylethyl ketone, ethyl acetate, butyl acetate, and the like. The reaction can be carried out at a temperature within the range of about −25° C. to 150° C., although lower and higher temperatures may be used. However, longer reaction times are needed at the lower temperatures to produce high yields. At the higher temperatures, yields of diepoxide tend to be low because side reactions form undesirable materials. However, these undesirable materials can be removed by conventional purification procedures, such as, fractional distillation. The reaction is continued until an analysis for epoxidizing agent indicates that an amount at least sufficient to epoxidize all the double bonds of the dicyclopentadiene has been consumed. In this connection it is desirable to employ an excess over the theoretical amount of peracetic acid to assure complete epoxidation. Upon discontinuance of the reaction, sidereaction products, solvent and unreacted material are removed by any convenient procedure, such as, by adding a potboiler, e.g., ethylbenzene, and stripping low-boiling materials. A solid, residual product identified as dicyclopentadiene dioxide is obtained. This product melts at about 184° C.

Polycarboxylic acids which can be used in our compositions are compounds containing two or more carboxy groups to the molecule. Typical polycarboxylic acids can be represented by the formula:

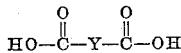

Y can represent a single bond or a divalent group composed of one carbon atom or groups of carbon atoms interconnected by single or multiple bonds, and to which such groups as hydrogen, alkyl, carboxy, chloro, bromo, amino, cyclic groups and the like or combinations thereof can be attached. Y can also represent a divalent group containing groups of carbon atoms interconnected by single or multiple bonds or ester linkages, i.e.,

or such other atoms as oxygen, sulfur or nitrogen atoms, interconnecting the carbon atom groups to which such other groups as previously mentioned may be attached. Y may represent cyclic groups, such as, phenylene, cyclohexylene, cyclohexenylene and the like. Polycarboxylic acids containing other groups not specifically mentioned herein and not participating in the curing reaction can be used in producing our polyesters and, in fact, can be particularly useful in developing special properties in our resins. Mixtures of polycarboxylic acids, or only one polycarboxylic acid, as desired, can be used in making our resins. Representative polycarboxylic acids include oxalic acid, malonic acid, succinic acid, glutaric acid, adipic acid, pimelic acid, suberic acid, azelaic acid, sebacic acid, alkylsuccinic acids, alkenylsuccinic acids, ethylbutenylsuccinic acid, maleic acid, fumaric acid, itaconic acid, citraconic acid, mesaconic acid, glutaconic acid, ethylidenemalonic acid, isopropylidenemalonic acid, allylmalonic acid, muconic acid, alpha-hydromuconic acid, beta-hydromuconic acid, diglycolic acid, dilactic acid, dithioglycolic acid, 4-amyl-2,5-heptadienedioic acid, 3-hexynedioic acid, 4,6-decadiynedioic acid, 2,4,6,8-decatetraenedioic acid, 1,2-cyclohexanedicarboxylic acid, 1,4-cyclohexanedicarboxylic acid, 2-carboxy-2-methylcyclohexaneacetic acid, phthalic acid, isophthalic acid, terephthalic acid, tetrahydrophthalic acid, tetrachlorphthalic acid, 1,8-naphthalenedicarboxylic acid, 3-carboxycinnamic acid, 1,2-naphthalenedicarboxylic acid, 1,1,5-pentanetricarboxylic acid, 1,2,4-hexanetricarboxylic acid, 2-propyl-1,2,4-pentanetricarboxylic acid, 5-octene-3,3,6-tricarboxylic acid, 1,2,3-propanetricarboxylic acid, 1,2,4-benzenetricarboxylic acid, 1,3,5-benzenetricarboxylic acid, 3-hexene-2,2,3,4-tetracarboxylic acid, 1,2,3,4-benzenetetracarboxylic acid, 1,2,3,5-benzenetetracarboxylic acid, 1,2,4,5-benzenetetracarboxylic acid, benzenepentacarboxylic acid, benzenehexacarboxylic acid and the like.

Also as polycarboxylic acids useful in our polymerizable compositions there are included compounds containing ester groups in addition to two or more carboxy groups and which can be aptly termed polycarboxy polyesters of polycarboxylic acids, such as those listed above, or the corresponding anhydrides of said acids, with polyhydric alcohols. Stated in other words, by the term "polycarboxy polyesters," as used herein, is meant polyesters containing two or more carboxy groups per molecule. These polycarboxy polyesters can be prepared by known condensation procedures, employing mole ratios favoring greater than equivalent amounts of polycarboxylic acid, or anhydride. More specifically, the amount of polycarboxylic acid, or anhydride, employed in the esterification reaction should contain more carboxy groups than are required to react with the hydroxyl groups of the amount of polyhydric reactant. Polyhydric alcohols which can be employed in preparing these polycarboxy polyesters include dihydric alcohols, such as ethylene glycol, diethylene glycol, triethylene glycol, tetraethylene glycol, 1,2-propylene glycol, 1,3-propylene glycol, dipropylene glycols, tripropylene glycols, polyoxyethylene glycols, polyoxypropylene glycols, 1,2-butylene glycol, 1,4-butylene glycol, pentane-2,4-diol, 2,2-dimethyltrimethylene glycol, hexane-1,4 diol, hexane-1,5-diol, hexane-1,6-diol, hexane-2,5-diol, 3-methylpentane-1,5-diol, 2-methylpentane-2,5-diol, 3-methylpentane-2,5-diol, 2,2-diethylpropane-1,3-diol, 2-ethylhexane-1,3-diol, 2,5-dimethylhexane-2,5-diol, octadecane-1,12-diol, 1-butene-3,4-diol, 2-butene-1,4-diol, 2-butyne-1,4-diol, 2,5-dimethyl-3-hexyne-2,5-diol, and the like; trihydric compounds, such as glycerol, trimethylolmethane, hexane-1,2,6-triol, 1,1,1-trimethylolpropane, and the like; tetrahydric compounds, such as pentaerythritol, diglycerol, and the like; and higher polyhydric compounds such as pentaglycerol, dipentaerythritol, polyvinyl alcohols and the like. Additional polyhydric alcohols useful in making polycarboxy polyesters can be prepared by the reaction of epoxides, e.g., diglycidyl ethers of 2,2-propane bis-phenol, and reactive hydrogen-containing organic compounds, e.g., polyfunctional amines, polycarboxylic acids, polyhydric alcohols and the like. In forming the polycarboxy polyesters that can be employed in the compositions of this invention it is preferable to use a dihydric, trihydric or tetrahydric aliphatic or oxaaliphatic alcohol. The mole ratios in which the polycarboxylic acid or anhydride can be reacted with polyhydric alcohols in preparing polycarboxylic polyesters useful in our compositions are those which provide polyesters having more than one carboxy group per molecule. In the case of trifunctional and tetrafunctional reactants in the esterification reaction, the mole ratios of the respective reactants must be such as to avert gelation. The preferred mole ratio ranges of dicarboxylic acid to trihydric or tetrahydric alcohols that have been found to provide polycarboxylic polyesters which preferably can be used in the compositions of this invention are presented in Table I.

TABLE I

| Polyhydric Alcohol | Mole Ratio of Dicarboxylic Acid or Anhydride to Polyhydric Alcohol |
| --- | --- |
| Trihydric Alcohol | 2.2 to 3.0 |
| Tetrahydric Alcohol | 3.3 to 4.0 |

It is particularly preferred, however, to employ polycarboxylic polyesters prepared from dicarboxylic acids or anhydrides and polyhydric alcohols in the mole ratios specified in Table II.

TABLE II

| Polyhydric Alcohol | Mole Ratio of Dicarboxylic Acid or Anhydride to Polyhydric Alcohol |
| --- | --- |
| Trihydric Alcohol | 2.5 to 3.0 |
| Tetrahydric Alcohol | 3.5 to 4.0 |

These polycarboxy polyesters can be obtained by condensing, in accordance with known procedures, a polyhydric alcohol and a polycarboxylic acid or anhydride. This condensation reaction may be conducted, for example, by heating the reactants to a temperature within the range from 100° C. to 200° C. with or without an acidic catalyst. Any water formed by the condensation reaction may be removed by distillation. The course of the reaction may be followed by making acid number determinations and the reaction can be stopped when a suitable polycarboxy polyester has been obtained. As preferred polycarboxylic acids, those which dissolve or are soluble in dicyclopentadiene dioxide below about 250° C. are advantageously employed.

Polycarboxylic acid anhydrides useful in producing our resins can be represented by the formula:

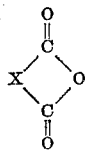

wherein X represents two or more carbon atoms interconnected by single or double bonds and to which such groups as hydrogen, alkyl, hydroxyl, nitro, chloro, iodo, bromo, cyclic, carboxyl groups and the like or combinations thereof may be attached. X can also represent groups containing carbon atoms interconnected by single or double bonds and oxydicarbonyl groups, i.e.,

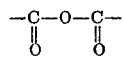

interconnecting the carbon atom groups to which other groups as previously mentioned may be attached. X may also represent such cyclic groups as phenylene, cyclohexylene, cyclohexenylene, and the like which may have one or more oxydicarbonyl groups attached thereto. Polycarboxylic acid anhydrides, containing other groups not specifically mentioned herein, and not taking part in the curing reaction may be used in our polymerizable compositions without harmful effects, and, in fact, may be used to develop particular properties in our resins. One polycarboxylic acid anhydride or a mixture of two or more, as desired, can be used in our polymerizable compositions. Typical polycarboxylic acid anhydrides include succinic anhydride, glutaric anhydride, propylsuccinic anhydride, methylbutylsuccinic anhydride, hexylsuccinic anhydride, heptylsuccinic anhydride, pentenylsuccinic anhydride, octenylsuccinic anhydride, nonenylsuccinic anhydride, alpha, beta-diethylsuccinic anhydride, maleic anhydride, chloromaleic anhydride, dichloromaleic anhydride, itaconic anhydride, citraconic anhydride, hexahydrophthalic anhydride, hexachlorphthalic anhydride, tetrahydrophthalic anhydride, methyltetrahydrophthalic anhydride, tetrachlorphthalic anhydride; hexachloroendomethylenetetrahydrophthalic anhydride, otherwise known as chlorendic anhydride, tetrabromophthalic anhydride, tetraiodophthalic anhydride; phthalic anhydride, 4-nitrophthalic anhydride, 1,2-naphthalic anhydride, 1,8-tetracarboxylic dianhydride; polymeric dicarboxylic acid anhydrides, or mixed polymeric dicarboxylic acid anhydrides such as those prepared by the autocondensation of dicarboxylic acids, for example, adipic acid, pimelic acid, sebacic acid, hexahydroisophthalic acid, terephthalic acid, isophthalic acid, and the like. Also, other dicarboxylic acid anhydrides, useful in our polymerizable compositions include the Diels-Alder adducts of maleic acid and aliphatic compounds having conjugated double bonds. Preferred polycarboxylic acid anhydrides are those which dissolve or are soluble in dicyclopentadiene dioxide at temperatures below about 250° C.

Catalysts which can be employed with advantageous effects in speeding the cure of our resins are the acidic catalysts including mineral acids and metal halide Lewis acids. Representative of mineral acids which can be used in aiding the cure of our resins include sulfuric acid, phosphoric acid, perchloric acid, polyphosphoric acid and the various sulfonic acids, such as, toluene sulfonic acid, benzene sulfonic acid and the like. Metal halide Lewis acids which are effective in speeding the cure of our resins include borontrifluoride, stannic chloride, zinc chloride, aluminum chloride, ferric chloride and the like. The metal halide Lewis acid catalysts can also be used in the form of such complexes as ether complexes and amine complexes, for example, borontrifluoride-piperidine and borontrifluoride-monoethylamine complexes. In the form of a complex, the metal halide Lewis acid catalyst is believed to remain substantially inactive until released as by dissociation of the complex upon increasing the temperature. When released from the complex, the catalyst then exerts its catalytic effect.

Uniform dispersion of catalyst in our polymerizable compositions prior to curing has been found to be desirable in order to obtain homogeneous resins and to minimize localized curing around catalyst particles. Agitation of the polymerizable compositions containing catalyst is adequate when the catalyst is miscible with said compositions. When the two are immiscible, the catalyst can be added in a solvent. Typical solvents for the catalysts include organic ethers, e.g., diethyl ether, dipropyl ether, 2-methoxy-1-propanol, organic esters, e.g., methyl acetate, ethyl acetate, ethylpropionate, organic ketones, e.g., acetone, methylisobutylketone, cyclohexanone, organic alcohols, e.g., methanol, cyclohexanol, propylene glycol and the like. The mineral acids can be employed as solutions in water, whereas metal halide Lewis acid catalysts tend to decompose in water and aqueous solutions of such Lewis acids are not preferred.

Our polymerizable compositions can be used in coatings, castings, moldings, bondings, laminates, and the like in the manufacture of articles, having a multitude of uses. These compositions can be colored by pigments and very appealing appearances may be imparted to articles made therefrom. Fillers can also be incorporated in our compositions so as to impart special properties to articles manufactured therefrom. For example, fibrous fillers, such as, glass fibers or asbestos, can be added to improve tensile and impact strengths. Powdered fillers, such as, iron oxide and aluminum oxide can be also added to improve hardness and compressive strength. Such sundry articles as buttons, combs, brush handles, structural parts for instrument cabinets and the like can be formed through the use of our polymerizable compositions and resins.

The following examples illustrate the invention. In these examples "parts" designates parts by weight. Barcol hardness values were obtained by the use of a Barcol Impressor GYZJ 934–1 and heat distortion values and Izod impact values were obtained in accordance with ASTM methods D–648–45T and D–256–47T, respectively. Neutral equivalents wherever provided indicate the number of grams of polyester for each carboxy group contained by the polyester. Neutral equivalents provided herein were obtained by titrating a one gram sample of the polyester dissolved in acetone or ethanol with 0.5 N NaOH. Unless otherwise specified, room temperatures are temperatures within the range of 25° C. to 30° C.

*Examples 1 through 7*

A series of 7 mixtures, each containing 1.64 parts of dicyclopentadiene dioxide and different amounts of different dicarboxylic acids, as correspondingly listed in Table I below, were prepared. Each mixture contained such amounts of diepoxide and acid as provided 1 carboxy equivalent of acid for each epoxy equivalent of diepoxide. The mixtures were then heated (to a temperature of about 120° C.) whereupon they became homogeneous. The mixtures were then heated at 160° C. for 6 hours after which time infusible resins having the properties listed in Table I were obtained from each mixture.

TABLE I

| Example Number | Dicarboxylic Acid | Parts of Acid | Resin Properties |
|---|---|---|---|
| 1 | Succinic | 1.18 | Dark brown. |
| 2 | Glutaric | 1.30 | Dark brown, tough, Barcol hardness of 35. |
| 3 | Sebacic | 2.00 | Dark brown, flexible. |
| 4 | Itaconic | 1.30 | Dark brown. |
| 5 | 2-Ethylbutenylsuccinic | 2.00 | Amber. |
| 6 | Maleic | 1.16 | Dark brown. |
| 7 | Diglycolic | 1.30 | Do. |

*Examples 8 through 15*

Eight mixtures were prepared from dicyclopentadiene dioxide and adipic acid. Each mixture contained 1.64 parts of the diepoxide and such amounts of acid as to provide the ratios of carboxy equivalent of epoxy equivalent as correspondingly listed in Table II below. Each mixture was then heated until it became homogeneous (at a temperature of about 120° C.). The mixtures were then maintained at 100° C. for 13 hours. Resins having the properties listed in Table II were obtained.

TABLE II

| Example Number | Parts of Adipic Acid | Ratio of Carboxy Equivalent/Epoxy Equivalent | Resin Properties |
|---|---|---|---|
| 8 | 0.29 | 0.2 | Brown, soft, fusible. |
| 9 | 0.58 | 0.4 | Brown, fusible. |
| 10 | 1.00 | 0.7 | Brown, infusible, tough, Barcol hardness of 31. |
| 11 | 1.50 | 1.0 | Brown, infusible, tough, Barcol hardness of 22. |
| 12 | 2.20 | 1.5 | Brown, infusible, tough. |
| 13 | 2.92 | 2.0 | Brown, soft, flexible. |
| 14 | 3.71 | 2.5 | Brown, soft, flexible, fusible. |
| 15 | 4.36 | 3.0 | Do. |

*Examples 16 through 22*

A series of 7 mixtures containing the respective types and amounts of polycarboxylic acids or anhydrides and polyhydric alcohols as correspondingly listed in Table III were prepared. The mole ratios of polycarboxylic acid or anhydride to polyhydric alcohol contained by each mixture are also correspondingly listed in Table III. Each mixture was separately heated and allowed to react at a temperature of 100° C. to 130° C. for 0.5 to 1 hour and then further heated at temperatures of 180° C. to 200° C. for an additional 0.5 to 1.0 hour. Any water formed was continuously removed from the reaction mixtures. The resulting polyesters contained carboxyl groups. Analyses for carboxyl groups were conducted and neutral equivalents are correspondingly listed in Table III.

TABLE III

| Example Number | Polycarboxylic Acid or Anhydride | Parts of Acid or Anhydride | Polyhydric Alcohol | Parts of Polyhydric Alcohol | Mol Ratio | Neutral Equivalent |
|---|---|---|---|---|---|---|
| 16 | Succinic anhydride | 120 | Pentaerythritol | 34 | 4.8 | 134 |
| 17 | do | 135 | Glycerol | 46 | 2.7 | 140 |
| 18 | do | 610 | 1,2,6-Hexanetriol | 268 | 6.1 | 139 |
| 19 | Maleic Anhydride | 93 | Ethylene Glycol | 31 | 1.9 | 163 |
| 20 | Dichloromaleic anhydride | 167 | do | 31 | 2.0 | 198 |
| 21 | Phthalic anhydride | 148 | do | 31 | 2.0 | 216 |
| 22 | Adipic acid | 146 | Glycerol | 29 | 3.0 | 159 |

*Example 23*

A mixture was prepared from 1.6 parts of dicyclopentadiene dioxide and 1.49 parts of the succinic anhydride-glycerol polyester prepared in Example 17. This mixture contained such amounts of diepoxide and polyester as provided 0.5 carboxy equivalent of polyester for each epoxy equivalent of diepoxide. The mixture was heated until it became homogeneous, occurring at about 100° C. The temperature of the mixture was raised and maintained at 160° C. for 20 minutes during which time a gel was formed. This gel was held at 160° C. for an additional 6 hours. After this treatment a tough, solvent-resistant, infusible resin having a Barcol hardness of 40 was obtained.

*Example 24*

A mixture containing 1.64 parts of dicyclopentadiene dioxide and 1.74 parts of the succinic anhydride-1,2,6-hexanetriol polyester prepared in Example 18 was prepared. This mixture contained such amounts of polycarboxy polyester and diepoxide as provided 0.6 carboxy equivalent of the polyester for each epoxy equivalent of the diepoxide. The mixture was heated until it became homogeneous, occurring at a temperature of about 100° C. The mixture was then raised to and maintained at a temperature of 160° C. for a total of 6 hours and 20 minutes during the first 20 minutes of which a gel was formed. After this treatment a tough, solvent-resistant, infusible resin having a Barcol hardness of 35 was obtained.

*Example 25*

A mixture was prepared from 1.64 parts of dicyclopentadiene dioxide and 1.61 parts of the succinic anhydride-pentaerythritol polyester prepared in Example 16. This mixture contained such amounts of polycarboxy polyester and diepoxide as provided 0.6 carboxy equivalent of the polycarboxy polyester for each epoxy equivalent of the diepoxide. The mixture was heated until it became homogeneous, occurring at about 120° C. The temperature of the mixture was then raised to and maintained at 160° C. for 6 hours and 20 minutes during the first 20 minutes of which a gel was formed. After this treatment a tough, solvent-resistant, infusible resin having a Barcol hardness of 43 was obtained.

Example 26

A mixture containing 17 parts of dicyclopentadiene dioxide and 18 parts of the succinic anhydride-glycerol polyester prepared in Example 17 was prepared. The mixture contained such amounts of polycarboxy polyester and diepoxide as provided 0.7 carboxy equivalent of the polyester for each epoxy equivalent of the diepoxide. The mixture was heated until it became homogeneous, occurring at about 100° C. The temperature of the mixture was raised to 120° C. and maintained there for 18 minutes during which time a gel was formed. The gel was cured for 3 hours at 120° C. and then for 6 hours at 160° C. After this treatment a tough, amber-colored, infusible resin having a heat distortion of 95° C., an Izod impact of 0.2 ft. lbs./inch of notch and a Barcol hardness of 42 was obtained.

Example 27

A mixture was prepared from 1.64 parts of dicyclopentadiene dioxide and 1.55 parts of the maleic anhydride-ethylene glycol polyester prepared in Example 19. The mixture contained such amounts of polycarboxy polyester and diepoxide as provided 0.5 carboxy equivalent of the polyester for each epoxy equivalent of the diepoxide. It was heated until homogeneous, occurring at a temperature of about 100° C. The mixture was raised to a temperature of 160° C. and maintained thereat for 6 hours and 5 minutes during the first five minutes of which a gel was formed. After this treatment a tough, pale yellow, infusible resin having a Barcol hardness of 22 was obtained.

Example 28

A mixture containing 1.64 parts of dicyclopentadiene dioxide and 2.38 parts of the dichloromaleic anhydride-ethylene glycol polyester formed in Example 20 was prepared. The mixture contained such amounts of polycarboxy polyester and diepoxide as provided 0.6 carboxy equivalent for each epoxy equivalent. The mixture was then heated to a temperature of 120° C. whereupon it became homogeneous. A gel formed upon the formation of a homogeneous mixture. The gel was raised to a temperature of 160° C. and held there for 6 hours. After this time a very hard, infusible resin was obtained.

Example 29

A mixture was prepared from 1.64 parts of dicyclopentadiene dioxide and 2.6 parts of the phthalic anhydride-ethylene glycol polyester prepared in Example 21. The mixture contained such amounts of polycarboxy polyester and diepoxide as provided 0.6 carboxy equivalent for each epoxy equivalent. The mixture was heated to 120° C. whereupon it became homogeneous. It was then raised to a temperature of 160° C. and maintained thereat for 6 hours and 12 minutes during the first 12 minutes of which a gel was formed. After this treatment a very hard, infusible resin was obtained.

Examples 30 through 34

Five mixtures, each containing 0.82 part of dicyclopentadiene dioxide and various amounts, as correspondingly listed in Table IV below, of the succinic anhydride-glycerol polyester formed in Example 17 were prepared. Each mixture contained such amounts of polycarboxy polyester and diepoxide as provided the ratios of carboxy equivalent to epoxy equivalent as correspondingly listed in Table IV. The mixtures were then separately heated until they became homogeneous, occurring at a temperature of 100° C. and then were heated for 11 hours at a temperature of 160° C. After this cure, resins having the properties correspondingly listed in Table IV were obtained from each mixture.

TABLE IV

| Example Number | Parts of Polycarboxy Polyester | Ratio of Carboxy to Epoxy Equivalents | Resin Properties |
| --- | --- | --- | --- |
| 31 | 0.37 | 0.3 | amber, hard, fusible. |
| 32 | 1.86 | 1.3 | brown, tough, infusible. |
| 33 | 2.48 | 1.7 | Do. |
| 34 | 3.10 | 2.2 | brown, soft, fusible. |
| 35 | 3.72 | 2.7 | Do. |

Example 35

A mixture containing 4.9 parts of dicyclopentadiene dioxide, 7.2 parts of the succinic anhydride-glycerol polyester prepared in Example 17 and 2.2 parts of phthalic anhydride was prepared. The mixture contained such amounts of polycarboxy polyester, anhydride and diepoxide as provided 1.0 carboxy equivalent of the polyester and 0.5 carboxy equivalent of the anhydride for each epoxy equivalent of the diepoxide. The mixture was heated to 110° C. whereupon it became homogeneous. It was then heated to 120° C. and maintained thereat for 4 minutes during which time a gel was formed. The gel was cured at 160° C. for 6 hours and a tough, infusible resin having a Barcol hardness of 49 was obtained.

Example 36

A mixture was prepared from 4.9 parts of dicyclopentadiene dioxide, 2.6 parts of adipic acid and 2.2 parts of phthalic anhydride. This mixture contained such amounts of acid, anhydride and diepoxide as provided 0.6 carboxy equivalent of the acid and 0.5 carboxy equivalent of the anhydride for each epoxy equivalent of the diepoxide. The mixture was heated until it became homogeneous, occurring at a temperature of 110° C., and was allowed to gel at 120° C., requiring about 1 hour. The gel thus formed was then heated to 160° C. and maintained thereat for 6 hours. An infusible resin having a Barcol hardness of 42 was obtained.

Example 37

A 23.1 weight percent solution (1085 grams) of peracetic acid in ethyl acetate was added dropwise with stirring to 198 grams of dicyclopentadiene at 40° C. During the 1⅔ hours required for the addition the temperature was maintained at 40° C. by cooling when necessary. After an additional 4 hour reaction period an analysis for peracetic acid indicated that the reaction was completed. The reaction mixture was diluted with 1 liter of ethylbenzene and the ethyl acetate, acetic acid, and part of the ethylbenzene were removed on a still column under reduced pressure. After removal of all of the acetic acid the product solution in ethylbenzene was cooled to $-10°$ C. The crystalline dicyclopentadiene dioxide was removed by filtration. A 123 gram yield of dicyclopentadiene dioxide having a melting point of 183 to 185° C. was obtained. By reducing the filtrate volume two additional cuts of crystalline product were obtained totaling 95 grams and having a melting point range of 178 to 181° C. The yield, based on the dicyclopentadiene charged, was 88.7 percent of the theoretical.

What is claimed is:

1. A curable composition comprising 4,10-dioxapentacyclo$[6.3.1.0^{2,7}.0^{3,5}.0^{9,11}]$dodecane and a polycarboxylic acid in such relative amounts so as to provide from 0.2 to 2.7 carboxy equivalents of said acid for each epoxy equivalent of said diepoxide, said polycarboxylic acid containing no reactive groups, other than carboxy groups, which would take part in the curing reaction of said curable composition.

2. A curable composition comprising 4,10-dioxapentacyclo$[6.3.1.0^{2,7}.0^{3,5}.0^{9,11}]$dodecane and a polycarboxylic acid in such relative amounts so as to provide from 0.5 to 2.0 carboxy equivalents of said acid for each epoxy equivalent of said diepoxide, said polycarboxylic acid containing no reactive groups, other than carboxy groups, which would take part in the curing reaction of said curable composition.

3. The curable composition of claim 2 wherein said polycarboxylic acid is adipic acid.

4. The curable composition of claim 2 wherein said polycarboxylic acid is glutaric acid.

5. The curable composition of claim 2 wherein said polycarboxylic acid is sebacic acid.

6. The curable composition of claim 2 wherein said polycarboxylic acid is maleic acid.

7. The curable composition of claim 2 wherein said polycarboxylic acid is succinic acid.

8. A curable composition comprising 4,10-dioxapentacyclo[6.3.1.$O^{2,7}$.$O^{3,5}$.$O^{9,11}$]dodecane and a polycarboxy polyester in such relative amounts as to provide from 0.2 to 2.7 carboxy equivalents of said polyester for each epoxy equivalent of said diepoxide, said polycarboxy polyester containing at least two carboxy groups and being prepared by esterifying a polyhydric alcohol with a compound selected from the group consisting of a polycarboxylic acid and a polycarboxylic acid anhydride in such mol ratios so as to avert gelation during the esterification reaction, said polycarboxy polyester containing no reactive groups, other than carboxy groups, which would take part in the curing reaction of said curable composition.

9. The curable composition of claim 8 wherein said polycarboxy polyester is succinic anhydride-glycerol polycarboxy polyester.

10. The curable composition of claim 8 wherein said polycarboxy polyester is maleic anhydride-ethylene glycol polycarboxy polyester.

11. The curable composition of claim 8 wherein said polycarboxy polyester is adipic acid-glycerol polycarboxy polyester.

12. A curable composition comprising 4,10-dioxapentacyclo[6.3,1.$O^{2,7}$.$O^{3,5}$.$O^{9,11}$]dodecane and a polycarboxylic acid in such relative amounts as to provide $y$ carboxy equivalents for each epoxy equivalent, and a polycarboxylic acid anhydride in such relative amounts as to provide $x$ carboxy equivalents for each epoxy equivalent wherein $y$ is a number from 0.2 to 2.7, wherein $x$ is a number from 0.0 to 1.0, wherein the sum of $x$ and $y$ is not greater than 2.7, wherein the ratio of $x/y$ is less than 1, and wherein said polycarboxylic acid and said polycarboxylic acid anhydride contain no reactive groups, other than carboxy groups, which would take part in the curing reaction of said curable composition.

13. The curable composition of claim 12 wherein said polycarboxylic acid is adipic acid and wherein said polycarboxylic acid anhydride is phthalic anhydride.

14. Resins obtained by heating the curable composition defined in claim 1.

15. Resins obtained by heating the curable composition defined in claim 2.

16. Resins obtained by heating the curable composition defined in claim 3.

17. Resins obtained by heating the curable composition defined in claim 4.

18. Resins obtained by heating the curable composition defined in claim 5.

19. Resins obtained by heating the curable composition defined in claim 6.

20. Resins obtained by heating the curable composition defined in claim 7.

21. Resins obtained by heating the curable composition defined in claim 8.

22. Resins obtained by heating the curable composition defined in claim 9.

23. Resins obtained by heating the curable composition defined in claim 10.

24. Resins obtained by heating the curable composition defined in claim 11.

25. Resins obtained by heating the curable composition defined in claim 12.

26. Resins obtained by heating the curable composition defined in claim 13.

References Cited in the file of this patent

UNITED STATES PATENTS

| | | |
|---|---|---|
| 2,623,023 | Koroly | Dec. 23, 1952 |
| 2,712,535 | Fisch | July 5, 1955 |
| 2,720,500 | Cody | Oct. 11, 1955 |
| 2,764,575 | Kohler et al. | Sept. 25, 1956 |
| 2,768,153 | Shokal | Oct. 23, 1956 |

FOREIGN PATENTS

| | | |
|---|---|---|
| 187,900 | Austria | Dec. 10, 1956 |

OTHER REFERENCES

Grant, Hackh's Chemical Dictionary, 3rd ed. (1944), p. 270, "dicyclopentadiene," McGraw-Hill Book Co., Inc.